Patented Apr. 22, 1924.

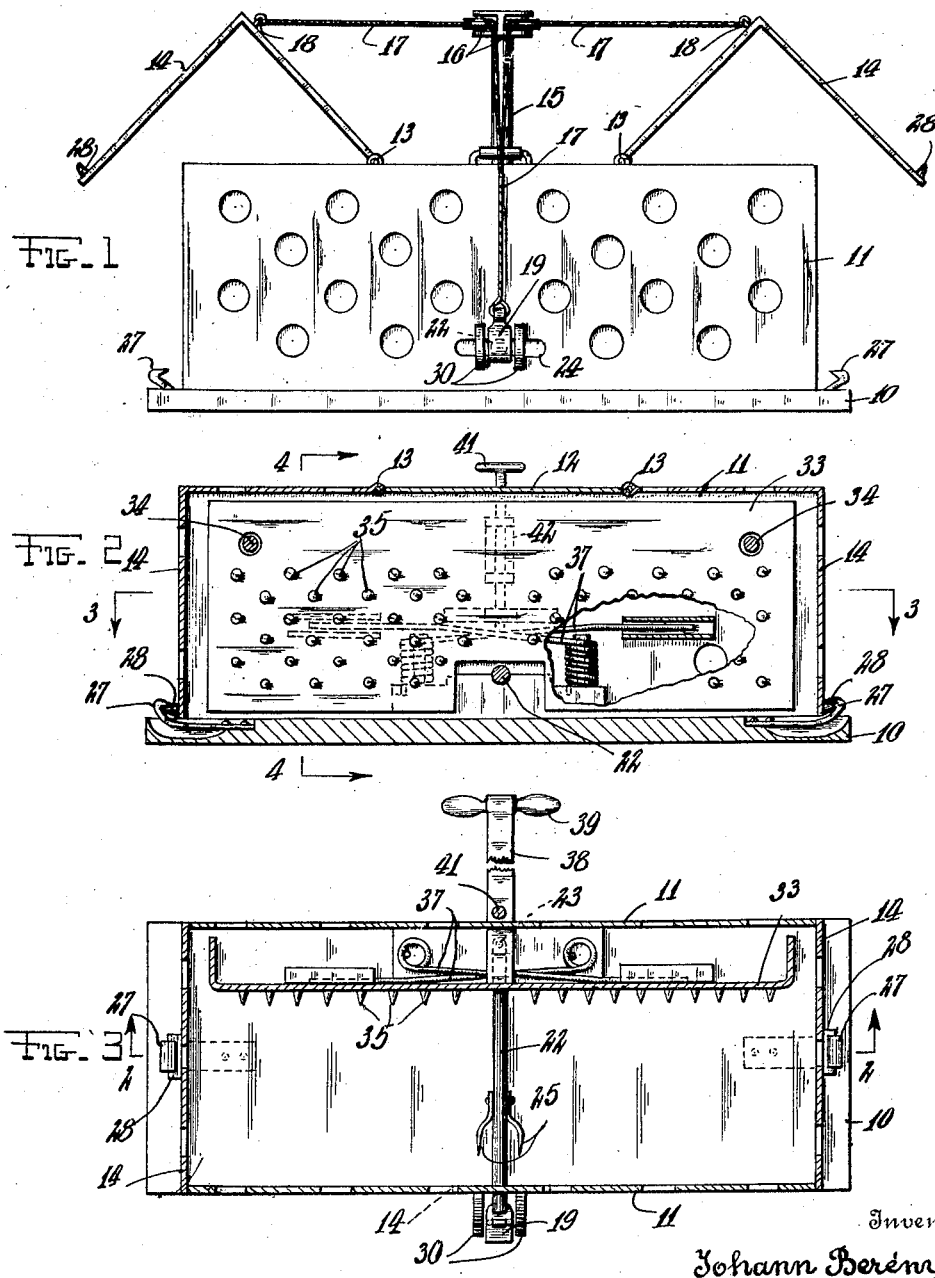

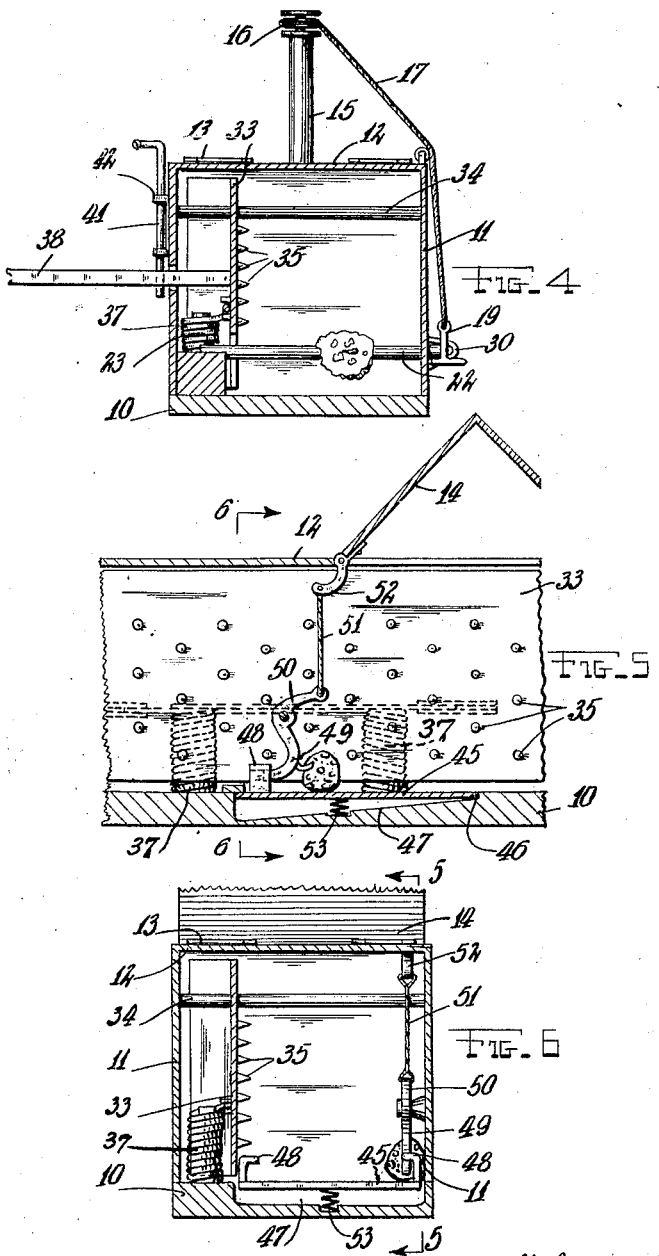

1,491,188

UNITED STATES PATENT OFFICE.

JOHANN BERÉNYI, OF PERTH AMBOY, NEW JERSEY.

RAT AND MOUSE TRAP.

Application filed March 15, 1923. Serial No. 625,266.

*To all whom it may concern:*

Be it known that JOHANN BERÉNYI, a citizen of the United States, residing at Perth Amboy, in the county of Middlesex and State of New Jersey, have invented certain new and useful Improvements in Rat and Mouse Traps, of which the following is a specification.

This invention relates to animal traps of the general type in which a cage or enclosure is provided into which the animal enters.

The invention has for a general object to provide a novel and efficient trap of this kind, and further to provide the trap with means whereby the animal may be killed while still in the trap if the trapper so desires.

For further comprehension of the invention, and of the objects and advantages thereof, reference will be had to the following description and accompanying drawings, and to the appended claims in which the various novel features of the invention are more particularly set forth.

Fig. 1 of the drawings is a side elevation of my improved trap with the doors open to receive the animal.

Fig. 2 is a longitudinal sectional view showing the doors closed, this view being taken on the line 2—2 of Fig. 3.

Fig. 3 is a horizontal sectional view taken on the line 3—3 of Fig. 2.

Fig. 4 is a transverse sectional view taken on the line 4—4 of Fig. 2.

Fig. 5 is a detail fragmentary longitudinal sectional view showing a modification, this view being taken along the line 5—5 of Fig. 6.

Fig. 6 is a transverse sectional view, taken on the line 6—6 of Fig. 5.

In constructing my improved trap I provide a rectangular cage or housing which here comprises a flat wooden base 10 to which are secured the side wall members 11, the latter being united by a transverse top strip 12 located midway between the ends of the trap. To the opposite edges, considered longitudinally of the trap, of this strip 12 are hinged as at 13 the angular doors 14 each comprising a horizontal arm and a vertical arm, the horizontal door arms completing the top of the cage while the vertical arms form the ends thereof.

Projecting upwardly from the strip 12 is a post 15 on whose upper ends two pulleys 16 are mounted. Around those pulleys lead cords 17 which are connected at one end as at 18 to the respective doors 14 and at their opposite ends to a free hanging hook 19 forming part of the trigger device.

Extending transversely of the cage, near the base 10, is a bar 22 pivoted at one end as at 23 adjacent one side wall of the cage to a block to swing horizontally, the opposite end projecting through an elongated opening 24 in the other side wall of the cage and being adapted to have the hook 19 caught thereunder. The bar 22 has a pair of bait-hooks 25 mounted thereon to receive a suitable bait. Mounted on the ends of the base 10 are spring catches 27 adapted to engage projections 28 on the lower edges of the doors 14 to lock the latter.

The doors 14 are held in the open position shown in Fig. 1 by the cords 17, the latch-hook 19 being engaged under the end of bar 22. When the animal enters the trap and pulls on the bait the bar 22 is swung on its pivot 23 free of the latch-hook 19 and the doors 14 are released and fall by gravity, the catches 27 snapping automatically into place. The latch-hook 19 is prevented from moving with the bar 22 by means of a pair of bent rods 30 fixed to the side of the cage and between which such hook is positioned.

To enable the animal to be killed in the trap I provide a vertical plate 33 extending longitudinally in the cage and slidably guided for transverse movement on cross-bars 34 extending between the side walls 11 of the cage, this plate having a series of spurs 35 suitably spaced over its inner face.

This plate 33 is urged toward one side of the cage by means of a pair of springs 37 located behind said plate and bearing thereagainst. The plate may be moved laterally in the cage, against the springs 37, by means of a flat bar 38 fixed at one end to the outer, or rear, face of the plate and extending through a suitable aperture in the side wall of the trap, this bar having a cross-piece 39 on its outer end to serve as a handle. To hold the plate 33 in position with the springs 37 compressed a latch-rod 41 is slidably guided in a bracket 42 fixed to the side wall of the cage and is adapted to project into an aperture in the bar.

When the trap is set the bar 28 is pulled outward to move the plate 33 against the springs 37 and the latch-rod 41 is engaged with said bar. The trapper, upon finding an animal in the trap may then release the latch 41, the springs 37 throwing the plate 33 across the trap and causing the animal to be crushed.

In the modification shown in Figs. 5 and 6 a horizontal platform 45 is hinged as at 46 at one end in a recess 47 in the base and has a pair of upstanding angular lugs 48 at the sides thereof one of which projects across the lower edge of the plate 33. Engaged under the offset upper end of one of these lugs is a pivoted latch 49 having a tail-piece 50 to which is attached one end of a cord 51 connected at its other end to a finger 52 fixed to the hinged edge of one of the doors 14. Bearing upward on the platform 45 is a spring 53. The parts are otherwise as above described.

In the use of this form of trap the plate 33 may be allowed to bear on one of the lugs 48 instead of being held by the latch 41. When the animal enters the trap, and the doors 14 are released and fall, the latch 49 is freed from the lug and the weight of the animal overcomes spring 53 and depresses platform 45 freeing the plate 33. Should the doors 14 be accidentally closed with no animal in the trap the plate 33 will not be released as the spring 53 will hold the platform 45 in raised position.

Having thus described my invention what I claim as new and desire to protect by Letters Patent of the United States is as follows:

1. In a trap, a cage, a vertical plate extending along said cage and movable transversely therethrough a spring pressing on said plate, and a latch holding said plate in position with the spring compressed.

2. In a trap, a cage, a vertical plate extending along said cage and movable transversely thereto, a spring pressing on said plate, and a latch holding said plate in position with the spring compressed, and a series of spurs projecting from the inner face of said plate.

3. In a trap, a cage, a door for closing the entrance thereto, a bait-holding trigger device retaining said door open, a vertical plate extending along said cage movable transversely thereto, a spring pressing on said plate, a horizontal hinged door in the base of the trap having a pair of upstanding lugs on the sides thereof, one of said lugs projecting across the lower edge of said plate, and a latch releasable upon closing movement of the first door engaging the other lug to hold said second door in position with the first lug engaged with the said plate.

In testimony whereof I have affixed my signature.

JOHANN BERÉNYI.